(12) United States Patent
Soma et al.

(10) Patent No.: US 11,411,451 B2
(45) Date of Patent: Aug. 9, 2022

(54) ROTOR

(71) Applicant: HONDA MOTOR CO., LTD., Tokyo (JP)

(72) Inventors: Shingo Soma, Saitama (JP); Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 16/656,906

(22) Filed: Oct. 18, 2019

(65) Prior Publication Data

US 2020/0127515 A1  Apr. 23, 2020

(30) Foreign Application Priority Data

Oct. 19, 2018 (JP) .............................. JP2018-197886

(51) Int. Cl.
*H02K 1/32* (2006.01)
*H02K 1/27* (2022.01)
*H02K 1/276* (2022.01)

(52) U.S. Cl.
CPC .............. *H02K 1/32* (2013.01); *H02K 1/276* (2013.01)

(58) Field of Classification Search
CPC ......... H02K 1/276; H02K 1/32; H02K 1/2766
USPC ........................................................ 310/61
See application file for complete search history.

(56) References Cited

U.S. PATENT DOCUMENTS

| | | | |
|---|---|---|---|
| 2010/0133941 A1* | 6/2010 | Feng ...................... | H02K 1/223 310/156.83 |
| 2014/0225470 A1* | 8/2014 | Yamaguchi .......... | H02K 1/2766 310/156.53 |
| 2014/0225471 A1* | 8/2014 | Kawanami ............. | H02K 1/274 310/156.53 |
| 2015/0048620 A1* | 2/2015 | Muniz ..................... | H02K 1/32 290/55 |

(Continued)

FOREIGN PATENT DOCUMENTS

| CN | 204967578 U | 1/2016 |
|---|---|---|
| CN | 108599416 A | 9/2018 |

(Continued)

OTHER PUBLICATIONS

Mar. 3, 2020, Japanese Office Action issued for related JP Application No. 2018-197886.

(Continued)

*Primary Examiner* — Alex W Mok
(74) *Attorney, Agent, or Firm* — Paratus Law Group, PLLC

(57) ABSTRACT

A rotor includes: a rotor core having: a plurality of magnet insertion holes; and a punched portion; and a plurality of magnetic pole portions. The punched portion is provided so as to pinch a q-axis magnetic path of each magnet pole portion in the radial direction with the plurality of magnet pole portions. The punched portion includes: a first punched hole located on a d-axis of each magnet pole portion; a pair of second punched holes facing each other across the first punched hole in the circumferential direction; and a pair of ribs formed between the first punched hole and the pair of second punched holes. The pair of ribs is provided such that a distance between the pair of ribs is increased from an outer side to an inner side in the radial direction.

6 Claims, 3 Drawing Sheets

(56) References Cited

U.S. PATENT DOCUMENTS

| | | | |
|---|---|---|---|
| 2015/0381015 A1* | 12/2015 | Hattori | H02K 9/19 |
| | | | 310/59 |
| 2016/0006307 A1* | 1/2016 | Yokota | H02K 1/2766 |
| | | | 310/59 |
| 2017/0070109 A1* | 3/2017 | Nigo | H02K 1/2766 |
| 2018/0048202 A1* | 2/2018 | Kumagai | H02K 1/27 |
| 2020/0021153 A1 | 1/2020 | Saito et al. | |

FOREIGN PATENT DOCUMENTS

| | | |
|---|---|---|
| JP | 2009-011011 A | 1/2009 |
| JP | 2010-081657 A | 4/2010 |
| JP | 2016-032340 A | 3/2016 |
| WO | WO 2018/131393 A1 | 7/2018 |

OTHER PUBLICATIONS

Aug. 3, 2021, Chinese Office Action issued for related CN application No. 201910992444.0.

* cited by examiner

ROTOR

CROSS-REFERENCE TO RELATED APPLICATIONS

The present application claims the benefit of priority of Japanese Patent Application No. 2018-197886, filed on Oct. 19, 2018, the content of which is incorporated herein by reference.

TECHNICAL FIELD

The present invention relates to a rotor of an electric rotary machine.

BACKGROUND ART

In recent years, a lighter and higher output electric rotary machine is required. With the weight reduction of the electric rotary machine, a rotor core is designed to be provided with a large number of punched holes.

For example, in JP-A-2010-081657, a rotor which includes a rotor core having a rotor shaft hole to which a rotor shaft is tightened, a plurality of magnet insertion holes provided along a circumferential direction, and a plurality of hole portions disposed between the rotor shaft hole and the plurality of magnet insertion holes in a radial direction and a plurality of magnetic pole portions constituted by magnets inserted into the magnet insertion holes has been disclosed.

With the increasing output of the electric rotary machine, a rotor with a larger diameter and higher-speed rotation has been developed. Due to the increase in diameter and rotation speed of the rotor, a centrifugal force applied to a magnet pole portion by rotation of the rotor and a circumferential inertial force applied to a magnet pole portion tend to increase due to the change in rotational speed of the rotor.

However, in the rotor disclosed in JP-A-2010-081657, a bending load due to a circumferential inertial force applied to each magnet pole portion by a centrifugal force applied to each magnet pole portion by rotation of the rotor and the rotational speed change of the rotor is received by a rib located on a d-axis of each magnet pole portion formed between a plurality of holes. Therefore, when the bending load due to the centrifugal force applied to each magnet pole portion by rotation of the rotor and the circumferential inertial force applied to each part of a magnetic pole by the rotational speed change of the rotor increases, the rib may be deformed, and thus the outer periphery of the rotor core may be deformed.

SUMMARY

The invention provides a rotor capable of effectively receiving a bending load due to a circumferential inertial force applied to a magnet pole portion by a change in rotational speed of the rotor while suppressing deformation of an outer peripheral portion of a rotor core.

According to an aspect of the invention, there is provided a rotor including: a rotor core having: a rotor shaft hole to which a rotor shaft is tightened; a plurality of magnet insertion holes provided along a circumferential direction; and a punched portion disposed between the rotor shaft hole and the plurality of magnet insertion holes in a radial direction; and a plurality of magnetic pole portions constituted by magnets inserted into the magnet insertion holes, wherein: the punched portion is provided so as to pinch a q-axis magnetic path of each magnet pole portion in the radial direction with the plurality of magnet pole portions; the punched portion includes: a first punched hole located on a d-axis of each magnet pole portion; a pair of second punched holes facing each other across the first punched hole in the circumferential direction; and a pair of ribs formed between the first punched hole and the pair of second punched holes; and the pair of ribs is provided such that a distance between the pair of ribs is increased from an outer side to an inner side in the radial direction.

Effects

According to the invention, while suppressing deformation of the outer peripheral portion of the rotor core, it is possible to effectively receive a bending load due to a circumferential inertial force applied to a magnet pole portion by the rotational speed change of the rotor.

DESCRIPTION OF EMBODIMENTS

Hereinafter, an embodiment of the invention will be described based on the attached drawings.

[Rotor Core]

A rotor core 1 is configured by laminating a plurality of electromagnetic steel plates in an axial direction of a rotor shaft 2 and constitutes a rotor 100 of a motor together with the rotor shaft 2 and a plurality of magnets 3 assembled to the rotor core 1.

Figure 1:
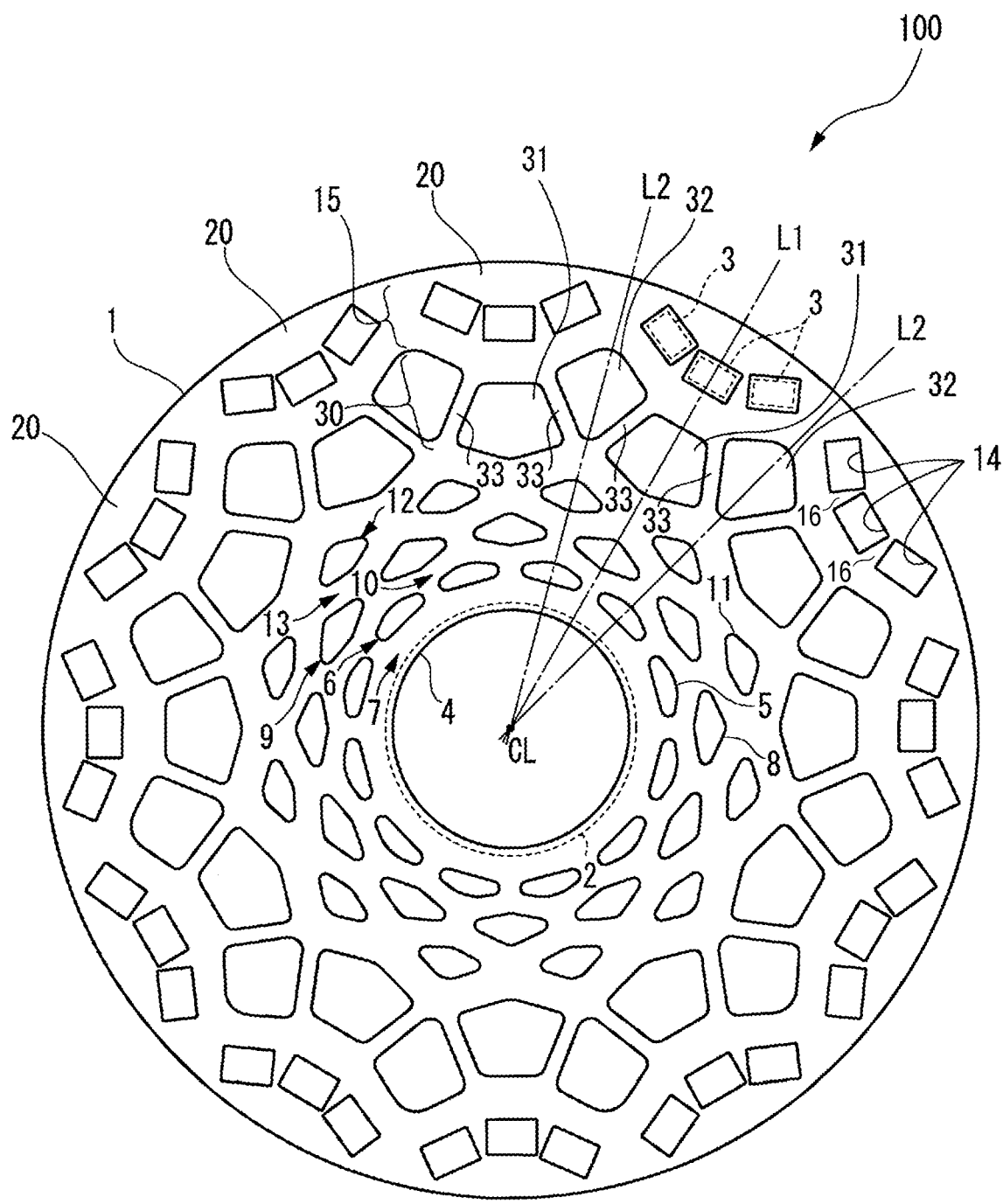
FIG. 1 is a front view of a rotor core according to an embodiment of the invention.

As illustrated in FIG. 1, the rotor core 1 has an annular shape in which a rotor shaft hole 4 into which the rotor shaft 2 is tightened by press-fitting is provided at a center CL. The rotor core 1 includes a first hole portion group 6 having a plurality of hole portions 5 provided on the outer side of the rotor shaft hole 4 in a radial direction and arranged in a circumferential direction and a shaft holding portion 7 provided between the rotor shaft hole 4 and the first hole portion group 6 in the radial direction. Further, the rotor core 1 includes a second hole portion group 9 having a plurality of hole portions 8 provided on the outer side of the first hole portion group 6 in the radial direction and arranged in the circumferential direction and a first annular portion 10 provided between the first hole portion group 6 and the second hole portion group 9 in the radial direction. Further, the rotor core 1 includes a third hole portion group 12 having a plurality of hole portions 11 provided on the outer side of the second hole portion group 9 in the radial direction and arranged in the circumferential direction, a second annular portion 13 provided between the second hole portion group 9 and the third hole portion group 12 in the radial direction, a punched portion 30 provided on the outer side of the third hole portion group 12 in the radial direction, and an electromagnetic portion 15 provided on the outer side of the punched portion 30 in the radial direction and having a plurality of magnet insertion holes 14 into which the magnets 3 are respectively inserted.

[Electromagnetic Portion]

The electromagnetic portion 15 is disposed on an outer peripheral portion of the rotor core 1 and faces a stator (not illustrated). In the electromagnetic portion 15, a plurality of magnetic pole portions 20 are formed at regular intervals along the circumferential direction. Each of the magnetic pole portions 20 is constituted of three magnets 3 inserted into three magnet insertion holes 14 arranged in a substantially arc shape which protrudes inward in the radial direction. The magnet 3 is, for example, a permanent magnet such as neodymium magnet. It is preferable that the magnetic pole portion 20 be configured such that a circumferential center portion is located radially inward of the rotor core 1 with respect to both circumferential end portions. For example, the magnetic pole portion 20 may be constituted of two magnets arranged in two magnet insertion holes arranged in a substantially V-shape opening radially outward or it may be constituted by one arc magnet arranged in one magnet insertion hole formed in an arc shape convex radially inward.

[Punched Portion]

The punched portion 30 is provided so as to radially pinch a q-axis magnetic path of each magnet pole portion 20 with a plurality of magnet pole portions 20 (electromagnetic portions 15). The punched portion 30 includes a first refrigerant flow passage hole 31 positioned on a virtual line L1 connecting the center of each magnet pole portion 20 and the center CL of the rotor core 1, a pair of second refrigerant flow passage holes 32 located on imaginary lines L2 passing through the circumferential end portions of each magnet pole portion 20 and the center CL of the rotor core 1 and facing each other across the first refrigerant flow passage hole 31, and a pair of ribs 33 formed between the first refrigerant flow passage hole 31 and the pair of second refrigerant flow passage holes 32. Further, the virtual line L1 coincides with a d-axis, which is the center axis of the magnetic pole portion 20, and the virtual line L2 coincides with a q-axis, which is 90 degrees apart from the d-axis by an electrical angle. At least two magnet-insertion-hole ribs 16 are formed between the plurality of magnet insertion holes 14.

The first refrigerant flow passage hole 31 and the second refrigerant flow passage hole 32 communicates with a refrigerant supply path (not illustrated) provided inside the rotor shaft 2. The refrigerant flows axially from one side of the first refrigerant flow passage hole 31 and the second refrigerant flow passage hole 32 to the other side, thereby cooling the magnet 3 arranged in each magnetic pole portion 20. As a result, since the refrigerant flow passage can be formed in a vicinity of the magnet pole portion 20, the cooling performance of the rotor 100 is improved.

The refrigerant may flow axially from the centers of the refrigerant flow passage hole 31 and the second refrigerant flow passage hole 32 to both sides to cool the magnet 3 disposed in each magnetic pole portion 20. The refrigerant which cooled the magnet 3 disposed in each magnetic pole portion 20 may be discharged to the outside from an end surface of the rotor core 1 or may return to the rotor shaft 2.

Among both circumferential end portions of the magnetic pole portion 20, the second refrigerant flow passage hole 32 located on one side is common to the second refrigerant flow passage hole 32 located on the other side of the magnetic pole portion 20 adjacent to the one side. In addition, among both circumferential end portions of the magnetic pole portion 20, the second refrigerant flow passage hole 32 located on the other side is common to the second refrigerant flow passage hole 32 located on one side of the magnetic pole portion 20 adjacent to the other side. That is, the first refrigerant flow passage holes 31 and the second refrigerant flow passage holes 32 are alternately arranged in the circumferential direction.

Therefore, the second refrigerant flow passage hole 32 on one side of the magnet pole portion 20 and the second refrigerant flow passage hole 32 on the other side of the magnet pole portion 20 adjacent to the one side can be made of one punched hole, and similarly, the second refrigerant flow passage hole 32 on the other side of the magnet pole portion 20 and the second refrigerant flow passage hole 32 on one side of the magnetic pole portion 20 adjacent to the other side can be made of one punched hole. As a result, the structure of rotor core 1 can be simplified.

[Shape of Refrigerant Flow Passage Hole]

Figure 2:
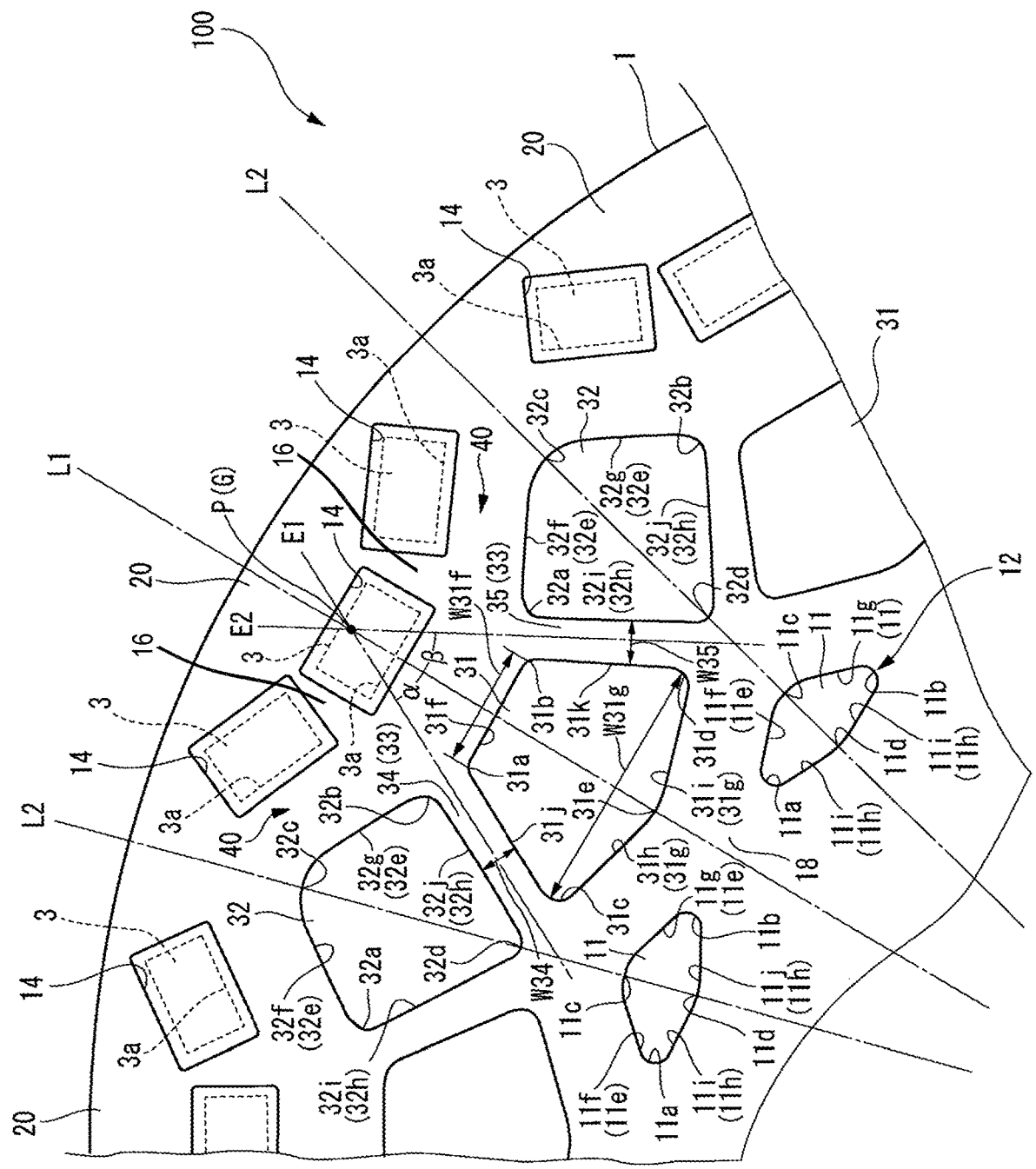
FIG. 2 is an enlarged view of a magnet pole portion and a punched portion.

As illustrated in FIG. 2, the first refrigerant flow passage hole 31 has a substantially pentagonal shape having an apex portion protruding radially inward. The first refrigerant flow passage hole 31 has an outer radial side first end portion 31a and an outer radial side second end portion 31b which form both circumferential end portions of the outer radial side, an inner radial side first end portion 31c and an inner radial side second end portion 31d which form both circumferential end portions of the inner radial side, and an inner radial side apex portion 31e which is disposed on the virtual line L1, has a shorter radial distance from the center CL of the rotor core 1 than the inner radial side first end portion 31c and the inner radial side second end portion 31d, and forms a radial inner side apex portion.

Further, the first refrigerant flow passage hole 31 has an outer peripheral wall 31f extending substantially linearly from the outer radial side first end portion 31a to the outer radial side second end portion 31b, an inner peripheral wall 31g having a first inner peripheral wall 31h extending substantially linearly from the inner radial side first end portion 31c to the inner radial side apex portion 31e and a second inner peripheral wall 31i extending substantially linearly from the inner radial side second end portion 31d to the inner radial side apex portion 31e, a first side wall 31j extending substantially linearly from the outer radial side first end portion 31a to the inner radial side first end portion 31c, and a second side wall 31k extending substantially linearly from the outer radial side second end portion 31b to the inner radial side second end portion 31d.

The outer peripheral wall 31f of the first refrigerant flow passage hole 31 is substantially orthogonal to the virtual line L1 and faces a radially inner end surface 3a of the magnet 3 disposed at the circumferential central portion of the magnet pole portion 20 with a q-axis magnetic path 40 interposed therebetween. The inner peripheral wall 31g of the first refrigerant flow passage hole 31 has a convex shape protruding radially inward. Furthermore, the inner peripheral wall 31g of the first refrigerant flow passage hole 31 is substantially parallel to an outer peripheral wall 11e of the hole portion 11 of the third hole portion group 12 adjacent to a rib 18 described below. More specifically, the first inner peripheral wall 31h of the first refrigerant flow passage hole 31 faces s substantially parallel to a second outer peripheral wall 11g of the hole portion 11 of the third hole portion group 12 adjacent to one side of the rib 18 described below and the second inner peripheral wall 31 of the first refrigerant flow passage hole 31 faces substantially parallel to a first outer peripheral wall 11f of the hole portion 11 of the third hole portion group 12 adjacent to the other side of the rib 18 described below.

Since the inner radial side apex portion 31e of the first refrigerant flow passage hole 31 is arranged on the virtual line L1, the first refrigerant flow passage hole 31 deforms such that the inner radial side apex portion 31e is pushed radially outward with respect to a tightening load of the rotor shaft 2. Due to the deformation of the first refrigerant flow passage hole 31, the tightening load of the rotor shaft 2 is absorbed by the first refrigerant flow passage hole 31. On the other hand, the outer peripheral wall 31f of the first refrigerant flow passage hole 31 has a linear shape orthogonal to the virtual line L1, a force acting on the outer peripheral wall 31f by the tightening load of the rotor shaft 2 has substantially no radial component at the circumferentially central portion of the outer peripheral wall 31f. Thereby, it can suppress that the outer peripheral portion of the rotor core 1 deforms radially outward by the tightening load of the rotor shaft 2. Therefore, it is possible to suppress deformation of the outer peripheral portion of the rotor core 1 by the tightening load of the rotor shaft 2 while absorbing the tightening load of the rotor shaft 2, the first refrigeration flow passage hole 31 can be arranged further on the outer peripheral side of the rotor core 1. As a result, it is possible to improve the cooling performance of the rotor 100.

The second refrigerant flow passage hole 32 has a substantially rectangular shape convex on both sides in the circumferential direction and both sides in the radial direction. The second refrigerant flow passage hole 32 has a first end portion 32a and a second end portion 32b forming both circumferential end portions, an outer radial side apex portion 32c which is disposed on the virtual line L2, has a longer radial distance from the center CL of the rotor core 1 than the first end portion 32a and the second end portion 32b, and forms a radially outer apex portion, and an inner radial side apex portion 32d which is disposed on the virtual line L2, has a shorter radial distance from the center CL of the rotor core 1 than the first end portion 32a and the second end portion 32b, and forms a radially inner apex portion.

In addition, the second refrigerant flow passage hole 32 includes an outer peripheral wall 32e which has a first outer peripheral wall 32f extending substantially linearly from the first end portion 32a to the outer radial side apex portion 32c and a second outer peripheral wall 32g extending substantially linearly from the second end portion 32b to the outer radial side apex portion 32c. Also, the second refrigerant flow passage hole 32 includes an inner peripheral wall 32h which has a first inner peripheral wall 32i extending substantially linearly from the first end portion 32a to the inner radial side apex portion 32d and a second inner peripheral wall 32j extending substantially linearly from the second end portion 32b to the inner radial side apex portion 32d.

The outer radial side apex portion 32c of the second refrigerant flow passage hole 32 is located radially outward of the innermost radial portion of the magnetic pole portion 20. As a result, since the refrigerant flow passage can be formed in the vicinity of the circumferential end portion of the magnetic pole portion 20, the cooling performance of the rotor 100 is improved.

In the outer peripheral wall 32e of the second refrigerant flow passage hole 32 located on one side of the magnetic pole portion 20, the second outer peripheral wall 32g faces substantially parallel to a radially inner end surface 3a of the magnet 3 disposed on the one side of the magnetic pole portion 20 with the q-axis magnetic path 40 interposed therebetween and the first outer peripheral wall 32f faces substantially parallel to a radially inner end surface 3a of the magnet 3 disposed on the circumferential other side of the magnetic pole portion 20 adjacent to the one side with the q-axis magnetic path 40 interposed therebetween. Similarly, in the outer peripheral wall 32e of the second refrigerant flow passage hole 32 located on the other side of the magnetic pole portion 20, the first outer peripheral wall 32f faces substantially parallel to a radially inner end surface 3a of the magnet 3 disposed on the other side of the magnetic pole portion 20 with the q-axis magnetic path 40 interposed therebetween and the second outer peripheral wall 32g faces substantially parallel to a radially inner end surface 3a of the magnet 3 disposed on one side of the magnetic pole portion 20 adjacent to the other side.

Thus, the second refrigerant flow passage hole 32 can be formed in the vicinity of the circumferential end portion of the magnetic pole portion 20 while securing the q-axis magnetic path, so that the cooling performance of the rotor 100 is improved without the q-axis inductance decreasing.

In the inner peripheral wall 32h of the second refrigerant flow passage hole 32 located on one side of the magnetic pole portion 20, the second inner peripheral wall 32j faces substantially parallel to the first side wall 31j of the first refrigerant flow passage hole 31 and the first inner peripheral wall 32i is substantially parallel to the second side wall 31k of the first refrigerant flow passage hole 31 of the magnetic pole portion 20 adjacent to one side. In the inner peripheral wall 32h of the second refrigerant flow passage hole 32 located on the other side of the magnetic pole portion 20, the first inner peripheral wall 32i faces substantially parallel to the second side wall 31k of the first refrigerant flow passage hole 31 and the second inner peripheral wall 32j faces substantially parallel to the first side wall 31j of the first refrigerant flow passage hole 31 of the magnetic pole portion 20 adjacent to the other side.

The inner radial side apex portion 32d of the second refrigerant flow passage hole 32 is arranged on the virtual line L2, so the second refrigerant flow passage hole 32 deforms so that the inner radial side apex portion 32d is pushed radially outward with respect to the tightening load of the rotor shaft 2. By the deformation of the second refrigerant flow passage hole 32, the tightening load of the rotor shaft 2 is absorbed by the second refrigerant flow passage hole 32. As a result, it is possible to arrange the second refrigerant flow passage hole 32 further on the outer peripheral side of the rotor core 1 while suppressing the deformation of the outer peripheral portion of the rotor core due to the tightening load of the rotor shaft 2, and thus the cooling performance of the rotor 100 is improved.

[Pair of Ribs]

A pair of ribs 33 has a first rib 34 formed between the first side wall 31j of the first refrigerant flow passage hole 31 and the second inner peripheral wall 32j of the second refrigerant flow passage hole 32 and a second rib 35 formed between the second side wall 31k of the first refrigerant flow passage hole 31 and the first inner peripheral wall 32i of the second refrigerant flow passage hole 32.

Since the first side wall 31j of the first refrigerant flow passage hole 31 and the second inner peripheral wall 32j of the second refrigerant flow passage hole 32 face substantially in parallel, a width W34 of the first rib 34 is substantially uniform. Since the second side wall 31k of the first refrigerant flow passage hole 31 and the first inner peripheral wall 32i of the second refrigerant flow passage hole 32 face substantially in parallel, a width W35 of the second rib 35 is substantially uniform.

Accordingly, since the pair of ribs 33 has a radially extending shape, the pair of ribs 32 can receive the centrifugal force applied to the magnet pole portion 20 by the rotation of the rotor 100.

Further, the pair of ribs 33 is provided such that the distance between the first rib 34 and the second rib 35 is increased from the radially outer side toward the radially inner side. Specifically, a width W31g of the inner peripheral wall 31g of the first refrigerant flow passage hole 31 is set to be longer than a width W31f of the outer peripheral wall 31f.

Therefore, the distance between the pair of ribs 33 increases as the pair of ribs 33 radially extends from the center of gravity G of the three magnets 3 constituting the magnet pole portion 20. Thereby, the pair of ribs 33 can receives the bending load due to the circumferential inertial force applied to the magnet pole portion 20 by the rotational speed change of the rotor 100 in the bending direction and can also dispersedly receive it in a compression (tension) direction. Therefore, the pair of ribs 33 can effectively receive a bending load due to the circumferential inertial force applied to the magnet pole portion 20 by the rotational speed change of the rotor 100.

The pair of ribs 33 is provided such that an intersection point P of an extension line E1 of the first rib 34 and an extension line E2 of the second rib 35 substantially coincides with a center of gravity G of the three magnets 3 constituting the magnet pole portion 20. Thereby, the pair of ribs 33 can more effectively receive the bending load due to the circumferential inertial force applied to the magnet pole portion 20 by the centrifugal force applied to the magnet pole portion 20 by the rotation of the rotor 100 and the rotational speed change of the rotor 100.

Assuming that an angle formed by the extension line E1 of the first rib 34 and the virtual line L1 (d-axis) is set as $\alpha$ and an angle formed by the extension line E2 of the second rib 35 and the virtual line L1 (d-axis) is set as $\beta$, both angles $\alpha$ and $\beta$ are 15 degrees or more and 45 degrees or less. More preferably, both angles $\alpha$ and $\beta$ are 15 degrees or more and 25 degrees or less.

Figure 3:
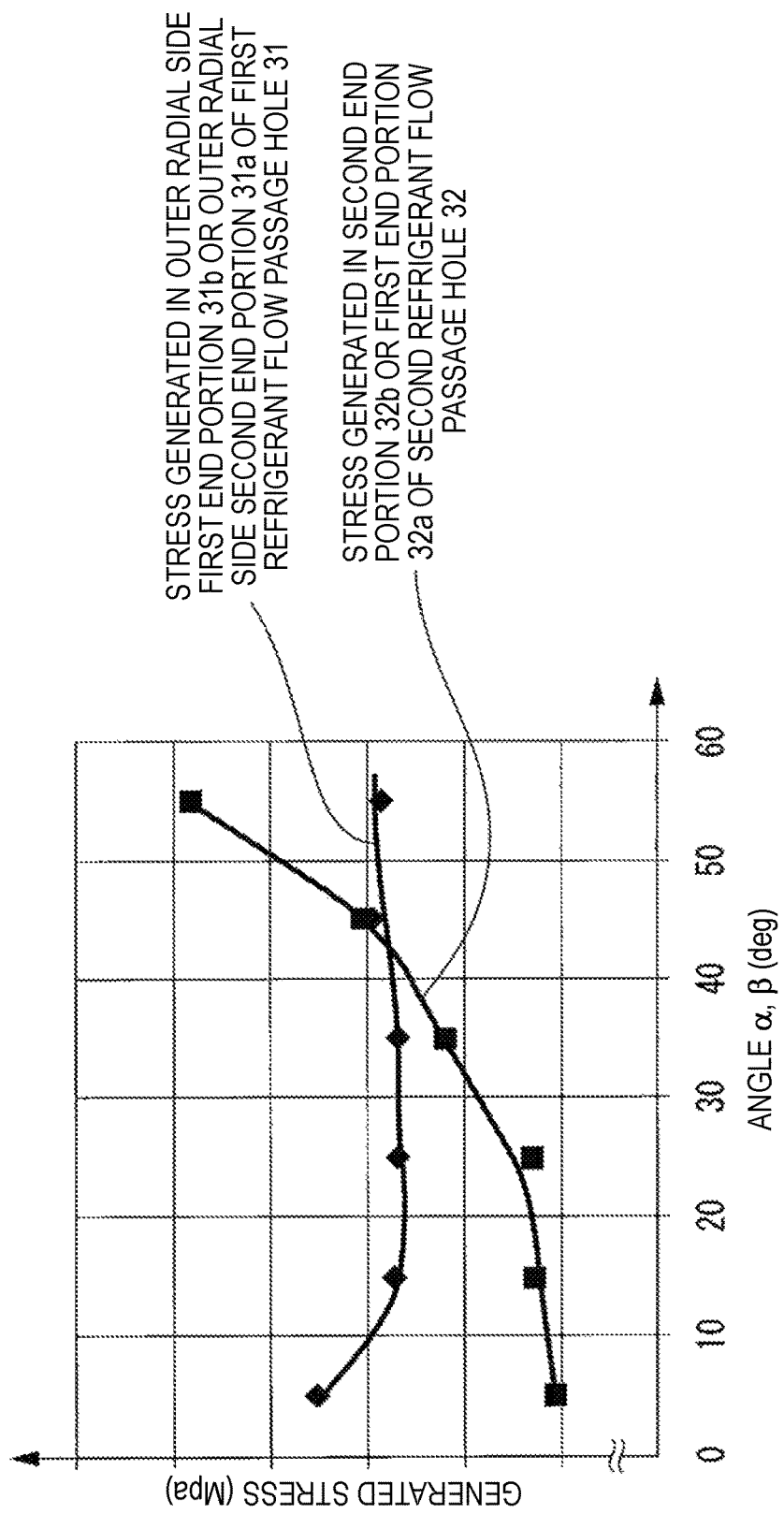
FIG. 3 is a diagram illustrating stress generated in an outer radial side circumferential end portion of a first refrigerant flow passage hole (first punched hole) and stress generated in a circumferential end portion of a second refrigerant flow passage hole (second punched hole), which are caused by a centrifugal force applied to the magnet pole portion by rotation of a rotor, when an angle formed by each rib of a pair of ribs is changed.

FIG. 3 is a diagram illustrating the stress generated in the outer radial side first end portion 31a or the outer radial side second end portion 31b of the first refrigerant flow passage hole 31 and the stress generated in the second end portion 32b or the first end portion 32a of the second refrigerant flow passage hole 32, which are caused by the centrifugal force applied to the magnet pole portion 20 by the rotation of the rotor 100, when the angles $\alpha$ and $\beta$, which are illustrated in FIG. 2, between the first rib 34 and the second rib 35 and the virtual line L1 (d-axis) are changed. In this case, the position and shape of the three magnet insertion holes 14, the three magnets 3, and the q-axis magnetic path 40 of the magnet pole portion 20 are not changed and the angles $\alpha$ and $\beta$ are changed while the intersection point P between the extension line E1 of the first rib 34 and the extension line E2 of the second rib 35 substantially coincides with the center of gravity G of the three magnets 3 constituting the magnet pole portion 20.

As illustrated in FIG. 3, when the angles $\alpha$ and $\beta$ are smaller than 15 degrees, the stress generated in the outer radial side first end portion 31a or the outer radial side second end portion 31b of the first refrigerant flow passage hole 31 increases. Therefore, by making both angles $\alpha$ and $\beta$ equal to or larger than 15 degrees, the stress concentration on the outer radial side first end portion 31a or the outer radial side second end portion 31b of the first refrigerant flow passage hole 31 due to the centrifugal force applied to the magnet pole portion 20 by the rotation of the rotor 100 can be alleviated.

On the other hand, when the angles $\alpha$ and $\beta$ are larger than 45 degrees, the stress generated in the second end portion 32b or the first end portion 32a of the second refrigerant flow passage hole 32 becomes greater than the stress generated in the outer radial side first end portion 31a of the outer radial side second end portion 31b of the first refrigerant flow passage hole 31. Therefore, by making both angles $\alpha$ and $\beta$ equal to or smaller than 45 degrees, the stress generated in the second end portion 32b or the first end portion 32a of the second refrigerant flow passage hole 32 by the centrifugal force applied to the magnet pole portion 20 by the rotation of the rotor 100 can be made equal to or less than the stress generated in the outer radial side first end portion 31a or the outer radial side second end portion 31b of the first refrigerant flow passage hole 31. When the angles $\alpha$ and $\beta$ are 25 degrees or less, the stress generated in the second end portion 32b or the first end portion 32a of the second refrigerant flow passage hole 32 is particularly small. Therefore, by making both angles $\alpha$ and $\beta$ 15 degrees or more and 25 degrees or less, both stress generated in the outer radial side first end portion 31a or the outer radial side second end portion 31b of the first refrigerant flow passage hole 31 and stress generated in the second end portion 32b or the first end portion 32a of the second refrigerant flow passage hole 32 can be reduced.

In the embodiment, the width W34 of the first rib 34 and the width W35 of the second rib 35 are substantially the same. Furthermore, the first rib 34 and the second rib 35 are arranged to be line-symmetrical with respect to the virtual line L1 (d-axis). Thereby, a pair of ribs 33 can receive in a well-balanced manner the bending load due to the circumferential inertial force applied to the magnet pole portion 20 by the centrifugal force applied to the magnet pole portion 20 by the rotation of the rotor 100 and the rotational speed change of the rotor 100.

Next, the first hole portion group 6, the second hole portion group 9, and the third hole portion group 12, which are disposed radially inward of the punched portion 30, will be described. The first hole portion group 6, the second hole portion group 9, and the third hole portion group 12 and the first annular portion 10 and the second annular portion 13, which are formed by those hole portion groups 6, 9, and 12, function as regions for absorbing the centrifugal force due to the rotation of the rotor and the tightening load of the rotor shaft 2.

[Hole Portion Group]

Returning to FIG. 1, each hole portion 5 of the first hole portion group 6 has a substantially triangular shape convex outward in the radial direction and the circumferential center position is disposed so as to intersect with the virtual line L2.

Each hole portion 8 of the second hole portion group 9 has a substantially rectangular shape convex on both sides in the circumferential direction and both sides in the radial direction and is disposed so that the circumferential center position is located on the virtual line L1.

Each hole portion 11 of the third hole portion group 12 has a substantially rectangular shape convex on both sides in the circumferential direction and both sides in the radial direction and is disposed so that the circumferential center position intersects with the virtual line L2.

As illustrated in FIG. 2, each hole portion 11 of the third hole portion group 12 has a first end portion 11a and a second end portion 11b which form both circumferential end portions, an outer radial side apex portion 11c which has a longer radial distance from the center CL of the rotor core 1 than the first end portion 11a and the second end portion 11b and forms a radial outer side apex portion, and an inner radial side apex portion 11d which has a shorter radial distance from the center CL of the rotor core 1 than the first end portion 11a and the second end portion 11b and forms a radial inner side apex portion.

Further, the hole portion 11 of the third hole portion group 12 includes an outer peripheral wall 11e having a first outer peripheral wall 11f extending substantially linearly from the first end portion 11a to the outer radial side apex portion 11c and a second outer peripheral wall 11g extending substantially linearly from the second end portion 11b to the outer radial side apex portion 11c. In addition, the hole portion 11 of the third hole portion group 12 includes an inner peripheral wall 11h having a first inner peripheral wall 11i extending substantially linearly from the first end portion 11a to the inner radial side apex portion 11d and a second inner peripheral wall 11j extending substantially linearly from the second end portion 11b to the inner radial side apex portion 11d.

Further, the rib 18 is formed between the adjacent hole portions 11 of the third hole portion group 12. The rib 18 is disposed so that the circumferential center position is located on the virtual line L1.

In the embodiment described above, modifications, improvements, and the like can be made as appropriate.

For example, in the embodiment, the first refrigerant flow passage hole 31 and the second refrigerant flow passage hole 32 provided in the punched portion 30 are made to flow a refrigerant which is a liquid medium. However, it is enough for the first refrigerant flow passage hole 31 and the second refrigerant flow passage hole 32, as long as they are punched holes, and further, the refrigerant may not flow in the first refrigerant flow passage hole 31 and the second refrigerant flow passage hole 32. Also, the refrigerant may flow in either one of the first refrigerant flow passage hole 31 and the second refrigerant flow passage hole 32.

At least the following matters are described in the present specification. In addition, although the constituent components corresponding in the embodiment described above are described in parentheses, it is not limited to this.

(1) A rotor (rotor 100) which includes a rotor core (rotor core 1) having a rotor shaft hole (rotor shaft hole 4) to which a rotor shaft (rotor shaft 2) is tightened, a plurality of magnet insertion holes (magnet insertion holes 14) provided along a circumferential direction, and a punched portion (punched portion 30) disposed between the rotor shaft hole and the plurality of magnet insertion holes in a radial direction and a plurality of magnetic pole portions (magnet pole portions 20) constituted by magnets (magnets 3) inserted into the magnet insertion holes, wherein:

the punched portion is provided so as to pinch a q-axis magnetic path (q-axis magnetic path 40) of each magnet pole portion in the radial direction with the plurality of magnet pole portions;

the punched portion includes:

a first punched hole (first refrigerant flow passage hole 31) located on a d-axis of each magnet pole portion;

a pair of second punched holes (second refrigerant flow passage holes 32) facing each other across the first punched hole in the circumferential direction; and a pair of ribs (a pair of ribs 33) formed between the first punched hole and the pair of second punched holes; and the pair of ribs is provided such that a distance between the pair of ribs is increased from an outer side to an inner side in the radial direction.

According to (1), since the pair of ribs is provided such that the distance between the pair of ribs is increased from the outer side to the inner side in the radial direction, it is possible to effectively receive a bending load due to the circumferential inertial force applied to the magnet pole portion by the rotational speed change of the rotor while suppressing the deformation of the outer peripheral portion of the rotor core (2) The rotor according to (1), wherein the pair of ribs is provided such that both angles (angles α and β) between extension lines (extension lines E1, E2) of the respective ribs (first rib 34, second rib 35) and the d-axis are set to be equal to or greater than 15 degrees.

According to (2), since the angles between the extension lines of the respective ribs and the d-axis are set to be equal to or greater than 15 degrees, it is possible to alleviate the stress concentration on the outer radial side circumferential end portion of the first punched hole due to the centrifugal force applied to the magnet pole portion by the rotation of the rotor.

(3) The rotor according to (1) or (2), wherein the pair of ribs is provided such that both angles between the extension lines (extension lines E1, E2) of the respective ribs (first rib 34, second rib 35) and the d-axis are set to be equal to or smaller than 45 degrees.

According to (3), since, in the pair of ribs, the angles between the extension lines of the respective ribs and the d-axis are set to be equal to or smaller than 45 degrees, the stress generated at the circumferential end portion of the second punched hole by the centrifugal force applied to the magnet pole portion by the rotation of the rotor is set to be equal to or less than the stress generated at the outer radial side circumferential end portion of the first punched hole.

(4) The rotor according to any one of (1) to (3), wherein the pair of ribs are provided such that an intersection (intersection p) of the extension lines (extension lines E1, E2) of the respective ribs (first rib 34, second rib 35) substantially coincides with a center of gravity (center of gravity G) of the magnet constituting the magnet pole portion.

According to (4), since the pair of ribs are provided such that the intersection of the extension lines of the respective ribs substantially coincides with the center of gravity of the magnet constituting the magnet pole portion, it is possible to more effectively receive the bending load due to the circumferential inertial force applied to the magnet pole portion by the centrifugal force applied to the magnet pole portion by the rotation of the rotor and the rotational speed change of the rotor.

(5) The rotor according to any one of (1) to (4), wherein a liquid medium flows in at least one of the first punched hole and the second punched hole.

According to (5), at least one of the first punched hole and the second punched hole can be a refrigerant flow passage through which the liquid medium flows. As a result, since the refrigerant flow passage can be formed in the vicinity of the magnet pole portion, the cooling performance of the rotor is improved.

(6) The rotor according to any one of (1) to (5), wherein: the second punched hole located on one side in the circumferential direction of the magnet pole portion is common to the second punched hole located on the other side of the magnet pole portion adjacent to the one side; and the second punched hole located on the other side of the magnet pole portion is common to the second punched hole located on the one side of the magnet pole portion adjacent to the other side.

According to (6), the second punched hole on one side of the magnet pole portion and the second punched hole on the other side of the magnet pole portion adjacent to the one side can be made of one common punched hole, and similarly, the second punched hole on the other side of the magnet pole portion and the second punched hole on one side of the magnet pole portion adjacent to the other side can be made of one common punched hole. As a result, the structure of rotor core can be simplified.

The invention claimed is:

1. A rotor comprising:
a rotor core having: a rotor shaft hole to which a rotor shaft is tightened; a plurality of magnet insertion holes provided along a circumferential direction; a magnet-insertion-hole rib formed between the magnet insertion holes; and a punched portion disposed between the rotor shaft hole and the plurality of magnet insertion holes in a radial direction; and
a plurality of magnetic pole portions constituted by magnets inserted into the magnet insertion holes, wherein:
the punched portion is provided so as to pinch a q-axis magnetic path of each magnet pole portion in the radial direction with the plurality of magnet pole portions;
the punched portion includes:
a first punched hole located on a d-axis of each magnet pole portion;
a pair of second punched holes facing each other across the first punched hole in the circumferential direction; and
a pair of punched hole ribs formed between the first punched hole and the pair of second punched holes;
the pair of punched hole ribs is provided such that a distance between the pair of punched hole ribs is increased from an outer side to an inner side in the radial direction;
at least three magnet insertion holes are formed in each of the magnetic pole portions, and at least two magnet-insertion-hole ribs are formed between the magnet insertion holes, the at least two magnet-insertion-hole ribs being comprised of a first magnet-insertion-hole rib and a second magnet-insertion-hole rib; and
in the circumferential direction, the first magnet-insertion-hole rib is positioned on one side of an extension line of one of the pair of punched-hole ribs, and the second magnet-insertion-hole rib is positioned on the other side of the extension line of the one of the punched-hole ribs, and the first magnet-insertion-hole rib is positioned on one side of an extension line of the other of the pair of punched-hole ribs, and the second magnet-insertion-hole rib is positioned on the other side of the extension line of the other of the punched-hole ribs.

2. The rotor according to claim 1, wherein
the pair of punched hole ribs is provided such that both angles between the extension lines of the respective punched hole ribs and the d-axis are set to be equal to or greater than 15 degrees.

3. The rotor according to claim 1, wherein
the pair of punched hole ribs is provided such that both angles between the extension lines of the respective ribs and the d-axis are set to be equal to or smaller than 45 degrees.

4. The rotor according to claim 1, wherein
the pair of punched hole ribs are provided such that an intersection of the extension lines of the respective punched hole ribs substantially coincides with a center of gravity of the magnet constituting the magnet pole portion.

5. The rotor according to claim 1, wherein
a liquid medium flows in at least one of the first punched hole and the second punched holes.

6. The rotor according to claim 1, wherein:
the second punched hole located on one side in the circumferential direction of the magnet pole portion is common to the second punched hole located on the other side of the magnet pole portion adjacent to the one side; and
the second punched hole located on the other side of the magnet pole portion is common to the second punched hole located on the one side of the magnet pole portion adjacent to the other side.

* * * * *